No. 801,054. PATENTED OCT. 3, 1905.
L. F. WILLIAMS.
RECHARGING VALVE.
APPLICATION FILED MAY 31, 1904.
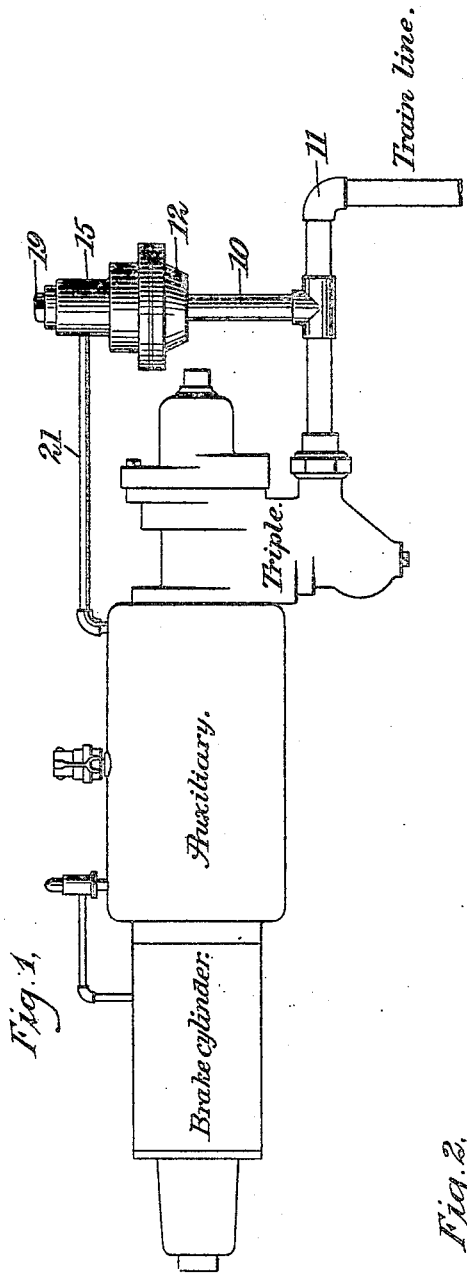
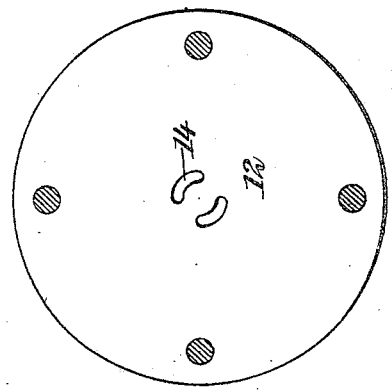
WITNESSES:
Edward Thorpe.
Isaac B. Owens.
INVENTOR
Leonard F. Williams
BY
ATTORNEYS

UNITED STATES PATENT OFFICE.

LEONARD F. WILLIAMS, OF THURBER, TEXAS.

RECHARGING-VALVE.

No. 801,054.    Specification of Letters Patent.    Patented Oct. 3, 1905.

Application filed May 31, 1904. Serial No. 210,509.

*To all whom it may concern:*

Be it known that I, LEONARD F. WILLIAMS, a citizen of the United States, and a resident of Thurber, in the county of Erath and State of Texas, have invented a new and useful Recharging-Valve, of which the following is a full, clear, and exact description.

The object of this invention is to permit recharging the auxiliary reservoirs of an automatic air-brake system without necessarily involving the release of the brakes. I attain this end by certain novel devices which will be fully set forth hereinafter and pointed out in the claims.

Reference is had to the accompanying drawings, which illustrate as an example a practical embodiment of my inventive idea, in which drawings similar characters of reference indicate like parts, and in which—

Figure 1 is a side elevation of the brake-cylinder, auxiliary reservoir, and triple valve, showing my invention applied. Fig. 2 is an enlarged section of the recharging-valve. Fig. 3 is a sectional plan view of the base thereof looking downward from the line 3 3 of Fig. 2.

10 indicates a branch from the train-line 11. Said branch 10 is in connection with the base 12 of the recharging-valve, and said base is formed with one or more ports 14, passing upward into the shell 15 of the valve. Said shell is bolted down onto the base, a gasket 16 being applied between the shell and base to effect an air-tight connection. This gasket is perforated uniformly with the ports 14. The shell 15 has two internal diameters, (indicated at $15^a$ and $15^b$, respectively.) In the upper part of the internal diameter $15^b$ is formed a vertical feed-groove 17, and working in this diameter $15^b$ is a piston 18, which when in the position shown in Fig. 2 lies opposite the feed-groove 17 and permits the free passage of the air past the piston. When, however, the piston 18 descends and strikes the gasket 16, the piston will not lie opposite the feed-groove, and hence air from the branch pipe 10 of the train-line will not be able to pass the piston 18.

Screwing in the upper part of the shell 15 and projecting into the smaller diameter $15^a$ thereof is a cap 19, forming a guide for the stem 20 of the piston 18. The piston 18 is formed with a feed-groove $18^a$, located on its upper portion and adapted to afford a passage between the piston and the shell 15 when the piston is raised, as shown in Fig. 2.

21 indicates a pipe connection passing from the shell 15 above the piston 18 into the auxiliary reservoir.

Upon a reduction of the train-line pressure to apply the brakes the movement of the triple piston and slide incident to this reduction will occur simultaneously with the movement of the piston 18 downward against the gasket 16, this movement being due to the preponderance of the auxiliary-reservoir pressure after the train-line reduction. When the piston 18 reaches its downward position, fluid movement past the piston is prevented. The triple slide may then be allowed to seat or lap as long as desired, and when the auxiliary is to be recharged it is only necessary to effect an increase in the train-line pressure. This raises the piston 18, and air flows through the recharging-valve into the auxiliary without passing through the triple valve. An additional volume of air passes through the triple valve; but it will be observed that the pressure on each side of the triple piston is equalized, and hence no movement of the triple piston to move the slide from lapped position takes place. It is in this manner that the auxiliaries are recharged without releasing the brakes. To release the brakes, a train-line increase should be made to a pressure greater than the capacity of the ports or feed-grooves 17 and $18^a$. This will lift the piston 18; but a preponderance of pressure will then pass into the triple valve and, acting on the piston thereof, will move the slide to its released position. A release of the brakes is therefore dependent upon a train-line increase to a pressure sufficiently great to cause a preponderance of pressure to pass into the auxiliary by way of the triple valve, thus overcoming the auxiliary-reservoir pressure.

As the piston travel of brake-cylinders is sometimes of different lengths, to prevent an excessive pressure being thrown into some of the cylinders each cylinder in the system should be provided with an automatic governor or pop valve set at the desired pressure, and to prevent the train-line and auxiliary-reservoir pressures from reaching too high a point when the train-line pressure is increased to release the valve the engineer's valve should be supplied with a special governor to equalize at the desired pressure.

The advantages of this invention will be apparent to persons skilled in the art, and especial enumeration is not herein necessary.

Various changes in the form, proportions, and minor details of the invention may be resorted to at will without departing from the spirit and scope thereof. Hence I consider myself entitled to all such variations as may lie within the terms of my claims.

Having thus described my invention, I claim as new and desire to secure by Letters Patent—

1. In an air-brake system, the combination with an auxiliary reservoir, a triple valve, and a train-line leading to the triple valve, of a valve-casing comprising a base having inlet-openings therein, a shell in two diameters, the larger diameter having a feed-groove, and a cap having a tubular extension projecting into the smaller diameter of the casing, a piston in the larger diameter of the casing and having its stem projecting into the tubular projection of the cap, the piston being provided in its upper face with a feed-groove, a branch leading from the train-line between the triple valve and the source of supply to the bottom of the valve-casing, and a connection between the smaller diameter of the shell and the auxiliary reservoir, substantially as herein shown and described.

2. In an air-brake system, the combination with an auxiliary reservoir, a triple valve, and a train-line leading to the triple valve, of a valve-casing having two internal diameters and provided with an inlet in its bottom, the larger diameter of the casing having a feed-groove in its wall, a piston in the larger diameter of the casing and provided with a stem having guided movement in the smaller diameter of the valve-casing, said piston being provided in its upper face with a feed-groove, a connection between the bottom of the casing and the train-line between the triple valve and the source of supply, and a connection between the smaller diameter of the valve-casing and the auxiliary reservoir, substantially as described.

3. In an air-brake system, the combination with an auxiliary reservoir, a triple valve, and a train-line leading to the triple valve, of a valve-casing provided in its bottom with a valve-seat having an inlet therein, a connection between the bottom of the valve-casing and the train-line, the connection being between the triple valve and the source of supply, a connection between the other end of the casing and the auxiliary reservoir, and a piston-valve in the valve-casing, said piston-valve and valve-casing being constructed when the piston-valve is raised from its seat by the pressure in the train-line to permit the air to pass to the auxiliary reservoir, substantially as described.

In testimony whereof I have signed my name to this specification in the presence of two subscribing witnesses.

LEONARD F. WILLIAMS.

Witnesses:
  W. G. RHODES,
  A. T. ALLRIGHT.